United States Patent
Lee et al.

(10) Patent No.: US 10,205,572 B2
(45) Date of Patent: Feb. 12, 2019

(54) SIGNAL PROCESSING SYSTEM AND SIGNAL PROCESSING METHOD

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 552 days.

(21) Appl. No.: 14/355,145

(22) PCT Filed: Oct. 31, 2012

(86) PCT No.: PCT/KR2012/009041
§ 371 (c)(1),
(2) Date: Apr. 29, 2014

(87) PCT Pub. No.: WO2013/066038
PCT Pub. Date: May 10, 2013

(65) Prior Publication Data
US 2015/0092685 A1    Apr. 2, 2015

(30) Foreign Application Priority Data

Oct. 31, 2011  (KR) .................. 10-2011-0112287
Mar. 27, 2012  (KR) .................. 10-2012-0031088

(51) Int. Cl.
*H04L 5/00* (2006.01)
*H04W 88/08* (2009.01)
*H04B 7/0413* (2017.01)

(52) U.S. Cl.
CPC ............ *H04L 5/0051* (2013.01); *H04L 5/005* (2013.01); *H04L 5/0023* (2013.01);
(Continued)

(58) Field of Classification Search
CPC ...... H04B 7/02; H04B 7/0404; H04B 7/0413; H04B 2001/70724; H04B 2201/70701; H04L 5/0069
See application file for complete search history.

(56) References Cited

U.S. PATENT DOCUMENTS

2005/0037759 A1*  2/2005  Sipila .................... H04W 36/12
                                                              455/438
2006/0046662 A1*  3/2006  Moulsley ............. H04B 7/0689
                                                              455/69

(Continued)

FOREIGN PATENT DOCUMENTS

KR        10-0903868 B1    6/2009
KR   10-2009-0101760 A     9/2009
(Continued)

OTHER PUBLICATIONS

Ralf Irmer et al., "Coordinated Multipoint: Concepts, Performance, and Field Trial Results", IEEE Communications Magazine, Feb. 2011, vol. 49, No. 2, pp. 102-111.
(Continued)

*Primary Examiner* — Andrew W Chriss
*Assistant Examiner* — Kenan Cehic
(74) *Attorney, Agent, or Firm* — IP Legal Services, LLC

(57) ABSTRACT

A signal processing system and a signal processing method are provided.
The signal processing system includes: a digital unit connected to a core system and configured to process a radio digital signal; and a plurality of radio units physically separated from the digital unit, configured to convert and amplify a digital signal received from the digital unit and transmit the amplified signal to a terminal based on a multi-input multi-output (MIMO) transmission using two antennas, and receive a signal transmitted from a terminal based on MIMO using the two antennas and deliver the
(Continued)

received signal to the digital unit, wherein two radio units, among the plurality of radio units, transmit data signals by using a cell-specific reference signal to a terminal located within a cell, rather than being located in a cell boundary area, under the control of the digital unit, and with respect to a terminal located in the cell boundary area and adjacent to a cell, a radio unit of the adjacent cell transmits a data signal by using a user-specific reference signal to the terminal.

3 Claims, 9 Drawing Sheets

(52) U.S. Cl.
CPC .......... *H04L 5/0035* (2013.01); *H04B 7/0413* (2013.01); *H04L 5/0069* (2013.01); *H04W 88/085* (2013.01)

(56) References Cited

U.S. PATENT DOCUMENTS

| | | | |
|---|---|---|---|
| 2010/0056170 | A1 | 3/2010 | Lindoff et al. |
| 2010/0189038 | A1 | 7/2010 | Chen et al. |
| 2010/0238821 | A1 | 9/2010 | Liu et al. |
| 2010/0285810 | A1 | 11/2010 | Ko et al. |
| 2010/0323709 | A1 | 12/2010 | Nam et al. |
| 2011/0010768 | A1 | 1/2011 | Barriga et al. |
| 2011/0170422 | A1 | 7/2011 | Hu et al. |
| 2011/0176634 | A1 | 7/2011 | Yoon et al. |
| 2011/0223962 | A1 | 9/2011 | Kuwahara et al. |
| 2011/0235608 | A1 | 9/2011 | Koo et al. |
| 2011/0275397 | A1 | 11/2011 | Guey et al. |
| 2011/0292826 | A1* | 12/2011 | Ahn ............... H04W 52/16 370/252 |
| 2012/0033608 | A1 | 2/2012 | Seo et al. |
| 2012/0106442 | A1* | 5/2012 | Xiao ............... H04W 72/044 370/328 |
| 2012/0113951 | A1 | 5/2012 | Koo et al. |
| 2012/0163202 | A1 | 6/2012 | Aguirre et al. |
| 2012/0275411 | A1 | 11/2012 | Kim et al. |
| 2013/0156001 | A1 | 6/2013 | Gomadam |
| 2014/0029696 | A1 | 1/2014 | Yoon et al. |
| 2014/0185573 | A1 | 7/2014 | Yoon et al. |
| 2014/0355711 | A1 | 12/2014 | Yoon et al. |
| 2015/0223178 | A1* | 8/2015 | Pietraski ............ H04L 5/001 370/252 |
| 2015/0311988 | A1* | 10/2015 | Baldemair ......... H04L 5/001 370/252 |
| 2017/0118663 | A1* | 4/2017 | Sorrentino ......... H04W 24/02 |

FOREIGN PATENT DOCUMENTS

| | | |
|---|---|---|
| KR | 10-2010-0065048 A | 6/2010 |
| KR | 10-2010-0118534 A | 11/2010 |
| KR | 10-2011-0084594 A | 7/2011 |
| KR | 10-2011-0132595 A | 12/2011 |
| WO | 2010/085190 A1 | 7/2010 |
| WO | 2010/123282 A2 | 10/2010 |

OTHER PUBLICATIONS

Samsung, "Design Considerations for CoMP Joint Transmission", R1-093382, 3GPP TSG RAN WG1 Meeting #58, Shenzhen, China, Aug. 24-Aug. 28, 2009.

Fujitsu, "CoMP Cell Set Configuration", R2-093075, 3GPP TSG-RAN WG2 Meeting #66, San Francisco, USA, May 4-8, 2009.

* cited by examiner

SIGNAL PROCESSING SYSTEM AND SIGNAL PROCESSING METHOD

CROSS REFERENCE TO RELATED APPLICATIONS

This application is a National Stage Patent Application of PCT International Patent Application No. PCT/KR2012/009041 (filed on Oct. 31, 2012) under 35 U.S.C. § 371, which claims priority to Korean Patent Application Nos. 10-2011-0112287 (filed on Oct. 31, 2011) and 10-2012-0031088 (filed on Mar. 27, 2012), the teachings of which are incorporated herein in their entireties by reference.

TECHNICAL FIELD

The present invention relates to a signal processing system and a signal processing method.

BACKGROUND ART

In general, a communication base station includes a digital signal processing unit and a radio signal processing unit together in a single physical system. However, such a communication base station including the digital signal processing unit and the radio signal processing unit is required to be installed in each and every cell. Such configuration limits optimization of cell design. In order to improve a cell design, a plurality of antennas is connected to a single base station. Through connecting multiple antennas to the single base station, a cell can be efficiently formed to reduce a coverage hole.

However, such structure limits maximization of system capacity although the cell design is improved. Thus, a novel structure of a base station and a transmission method thereof are required to maximize radio capacity.

DISCLOSURE

Technical Problem

The present invention has been made in an effort to provide a signal processing system and a signal processing method capable of maximizing capacity of a communication system.

Technical Solution

An exemplary embodiment of the present invention provides a signal processing system including: a digital unit connected to a core system and configured to process a radio digital signal; and a plurality of radio units physically separated from the digital unit, configured to convert and amplify a digital signal received from the digital unit and transmit the amplified signal to a terminal based on a multi-input multi-output (MIMO) transmission using two antennas, and receive a signal transmitted from a terminal based on MIMO using the two antennas and deliver the received signal to the digital unit, wherein two radio units, among the plurality of radio units, transmit data signals by using a cell-specific reference signal to a terminal located within a cell, rather than being located in a cell boundary area, under the control of the digital unit, and with respect to a terminal located in the cell boundary area and adjacent to a cell, a radio unit of the adjacent cell transmits a data signal by using a user-specific reference signal to the terminal.

The two radio units may transmit signal strength values of an uplink received from the terminal to the digital unit, and the digital unit may determine whether the terminal is adjacent to one cell within the boundary area on the basis of the signal strength values transmitted from the two radio units.

When an absolute value of a difference between the signal strength values transmitted from the two radio units falls between a first threshold value and a second threshold value, the digital unit may determine that the terminal is adjacent to a cell in the boundary area, and control a radio unit of the adjacent cell to transmit data by using a user-specific reference signal.

When an absolute value of a difference between the signal strength values transmitted from the two radio units is greater than or equal to the first threshold value, the digital unit may control the two radio units to transmit data by using the cell-specific reference signal.

Resources may be allocated such that a cell resource in a case in which the radio unit transmits data by using the cell-specific reference signal and a cell resource in a case in which the radio unit transmits data by using the user-specific reference signal are different.

Another embodiment of the present invention provides a signal processing system including: a digital unit connected to a core system and configured to process a radio digital signal; and a plurality of radio units physically separated from the digital unit, configured to convert and amplify a digital signal received from the digital unit and transmit the amplified signal to a terminal based on a multi-input multi-output (MIMO) using two antennas, and receive a signal transmitted from a terminal based on MIMO using the two antennas and deliver the received signal to the digital unit, wherein two radio units, among the plurality of radio units, transmit data signals by using a cell-specific reference signal to a terminal located within a cell, rather than being located in a cell boundary area, under the control of the digital unit, and with respect to a terminal located in the cell boundary area, the two radio units transmit the same data signal by using a user-specific reference signal.

The two radio units may transmit the data signal by using a single antenna port, respectively.

The two radio units may transmit the data signal by using two antenna ports, respectively.

The two radio units may transmit signal strength values of uplink received from the terminal to the digital unit, and when an absolute value of a difference between the signal strength values transmitted from the two radio units is equal to or greater than the first threshold value, the digital unit controls the two radio units to transmit data by using the cell-specific reference signal.

When the absolute value of a difference between the signal strength values transmitted from the two radio units falls between the first threshold value and a second threshold value, the digital unit may determine that the terminal is adjacent to a cell in the boundary area, and when the absolute value of a difference between the signal strength values transmitted from the two radio units falls between the second threshold value and a third threshold value, the digital unit may determine that the terminal is located in an overlap area within the boundary area, and the digital unit may control the two radio units to transmit the same data signal by using the user-specific reference signal.

Resources may be allocated such that a cell resource in a case in which the radio unit transmits data by using the cell-specific reference signal and a cell resource in a case in which the radio unit transmits data by using the user-specific reference signal are different.

Yet another embodiment of the present invention provides a method in which a digital unit, which processes a radio signal digital, processes signals from a plurality of radio units, which are installed in a service area to process radio signals and which transmit and receive signals to and from a terminal based on multi-input multi-output (MIMO) using two antennas, including: determining whether the terminal is adjacent to a cell within a boundary area between cells to which two radio units belong and whether the terminal is located in an overlap area within the boundary area, on the basis of signal strength values received from the two radio units, among the plurality of radio units; when the terminal is adjacent to a cell within the boundary area, controlling a radio unit of the adjacent cell to transmit a data signal by using a user-specific reference signal; and when the terminal is located in the overlap area within the boundary area, controlling the two radio units to transmit the same data signal by using a user-specific reference signal.

In the determining, when the terminal is included in only one of the cells, rather than being in the boundary area, on the basis of the signal strength values received from the two radio units, the two radio units may transmit data signals by using the cell-specific reference signal to the terminal located within the cell, respectively.

The determining may include: receiving signals strength values of uplink, which have been received by the two radio units among the plurality of radio units, from the terminal, from the two radio units; and when an absolute value of a difference between the received signal strength values is equal to or greater than a first threshold value, determining that the terminal is included in only one of the cells, rather than being in the boundary area, when the absolute value of a difference between the received signal strength values falls between the first threshold value and a second threshold value, determining that the terminal is adjacent to a cell in the boundary area, and when the absolute value of a difference between the received signal strength values falls between the second threshold value and a third threshold value, determining that the terminal is located in an overlap area within the boundary area.

Still another embodiment of the present invention provides a method in which a radio unit, which transmits and receives a signal to and from a terminal on the basis of multi-input multi-output (MIMO) transmission using two antennas, installed in a service area, and processes a signal with respect to a terminal, including: transmitting a signal strength value received from the terminal to a digital unit; and transmitting a data signal by using a cell-specific reference signal to a terminal located within a cell, rather than being located in a cell boundary area, under the control of the digital unit, and transmitting, by a radio unit of an adjacent cell, a data signal by using a user-specific reference signal to a terminal located in the cell boundary area and adjacent to the cell.

The digital unit may be connected to a plurality of radio units, may be physically separated from the plurality of radio units, and may digitally process radio signals from the radio units and deliver the processed signals to a core system. Resources may be allocated such that a cell resource in a case in which the radio unit transmits data by using the cell-specific reference signal and a cell resource in a case in which the radio unit transmits data by using the user-specific reference signal are different.

Still another method is provided, in which a radio unit, which exchanges signals with a terminal on the basis of multi-input multi-output (MIMO) transmission using two antennas, installed in a service area, and processes a signal with respect to a terminal, including: transmitting a signal strength value for the signal received from the terminal to a digital unit; and transmitting a data signal by using a cell-specific reference signal to a terminal located within a cell, rather than being located in a cell boundary area, under the control of the digital unit, and transmitting, by two radio units forming the cell boundary, the same data signal by using a user-specific reference signal to a terminal located in a cell boundary area.

The two radio units may transmit each of the data signal by using a single respective antenna port.

The two radio units may transmit each of the data signal by using two respective antenna ports.

Advantageous Effects

According to an embodiment of the present invention, channel prediction performance of terminals located within a cell, in a cell boundary, or in a cell overlap area may be improved through a reference signal.

Also, performance may be improved by maximizing a diversity effect of a terminal located in a boundary area.

MODE FOR INVENTION

Figure 1:
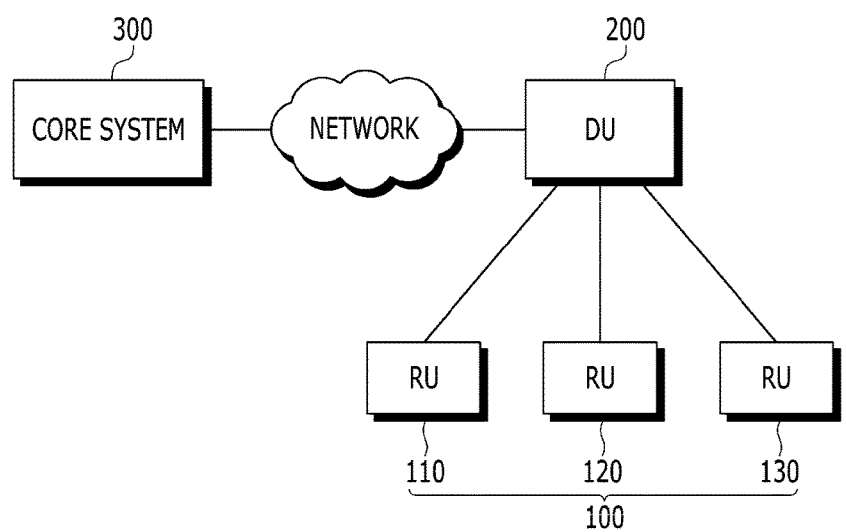
FIG. 1 is a schematic view illustrating a network according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, "module" described in the specification mean units for processing at least one function and operation, and can be implemented by hardware components or software components and combinations thereof.

Throughout the specification, a terminal may refer to a mobile station (MS), a mobile terminal (MT), a subscriber station (SS), a portable subscriber station (PSS), user equipment (UE), or an access terminal (AT), and may include the entirety or a portion of functions of the terminal, the MT, the SS, the PSS, the UE, the AT, or the like.

Also, a base station (BS) may refer to an access point (AP), a radio access station (RAS), a node B, an evolved node B (eNodeB), a base transceiver station (BTS), a mobile multihop relay (MMR)-BS, or the like, and may include the entirety or a portion of functions of the AP, the RAS, the node B, the eNodeB, the BTS, the MMR-BS, or the like.

Hereinafter, a signal processing system according to an embodiment of the present invention will be described in detail with reference to the accompanying drawings.

FIG. 1 is a schematic view illustrating a network according to an embodiment of the present invention.

Referring to FIG. 1, a network according to an embodiment of the present invention includes one or more radio units (RUs) 100, a digital unit (DU) 200, and a core system 300

The radio units 100 and the digital unit 200 constitute a signal processing system for wireless communication.

Each of the radio units 100, as part of processing a radio signal, converts a digital signal received from the digital unit 200 into a radio frequency (RF) signal and amplifies the same according to a frequency band. As shown, radio units 100 are a plurality of radio units 110, 120, and 130 and are connected to the digital unit 200. Each of the radio units 100 is installed in a corresponding service target area, namely, a cell. The radio units 100 and the digital unit 200 may be connected through an optical cable.

The digital unit 200 performs encoding or decoding on a radio digital signal. The digital unit 200 is connected to the core system 300. Unlike the radio units 100, the digital unit 200 is a server or a virtualized base station. The digital unit 200 is mainly installed in telecommunication office rather than being installed in a service target area. The digital unit 200 transmits and receives one or more signals to and from a plurality of radio units 100.

A typical communication base station includes a processing unit corresponding to each of the radio units 100 and the digital unit 200 in a single physical system, and a single physical system is installed in a service target area. Unlike the typical communication base station, the system according to an embodiment of the present invention includes the radio units 100 and the digital unit 200, which are physically separated. Only the radio units 100 are installed in a service target area.

The core system 300 establishes and manages a connection between the digital unit 200 and an external network. The core system 300 includes a switching unit (not shown).

Hereinafter, a cell structure according to an embodiment of the present invention will be described with reference to FIG. 2.

Figure 2:
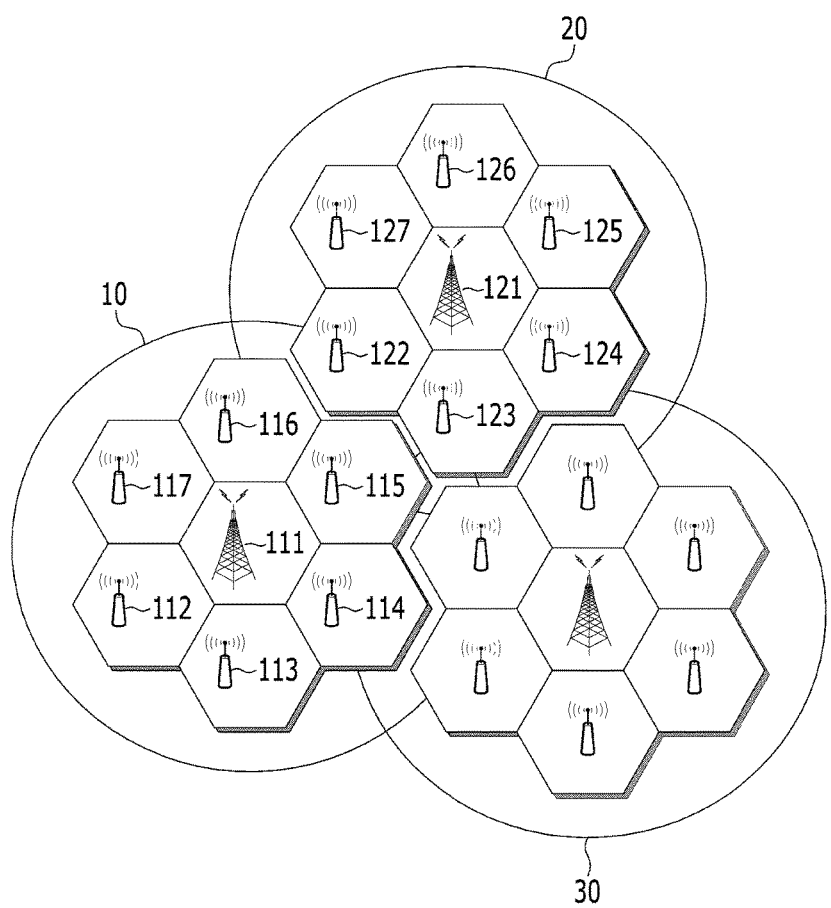
FIG. 2 is a schematic view illustrating a configuration of a cell according to an embodiment of the present invention.

FIG. 2 is a schematic view illustrating a configuration of a cell according to an embodiment of the present invention.

Referring to FIG. 2, cells 10, 20, and 30 according to an embodiment of the present invention include a plurality of radio units 100. The radio units 100 include macro radio units 111 and 121 and a plurality of cooperative radio units 112, 113, 114, 115, 116, 117, 122, 123, 124, 125, 126, and 127.

The macro radio units 111 and 121 handle major communication processing of cells 10 and 20, and transmit signals to every terminal within the cells 10 and 20 with high output power. The cooperative radio units 112 to 117 and 122 to 127 transmit signals to a terminal therearound with less output power than that of the macro radio units 111 and 121.

The single cell 10 includes at least one macro radio unit 111 and a plurality of cooperative radio units 112 to 117. All the radio units 100 included in the plurality of cells 10, 20, and 30 are under the control of the digital unit 200.

Meanwhile, a radio signal transmitted by the radio units 100 to a terminal includes a control signal providing basic system information and data channel allocation information, a data signal transmitting user data, a reference signal for channel estimation, and the like.

The plurality of cooperative radio units 112 to 117 included in the single cell 10 transmit a control signal and a reference signal identical to those of the macro radio unit 111 included in the same cell 10.

Also, the radio units 100 included in different cells 10, 20, and 30 transmit different control signals and reference signals. For example, reference signals transmitted by the radio units 111 to 117 included in the cell 10 are different from those transmitted by the radio units 121 and 127 included in the cell 20.

In this manner, a terminal may effectively receive a control signal and a reference signal commonly transmitted in a cell since the plurality of cooperative radio units 112 to 117 and 122 to 127, as well as the macro radio units 111 and 121, are installed in each single cell.

Meanwhile, the radio units 111 to 117 and 121 to 127 according to an embodiment of the present invention use two antennas to support 2×2 multi-input multi-output (MIMO) transmission. In this case, patterns of reference signals used by every two antennas of the radio units 111 to 117 and 121 to 127 should be different. For example, among two antennas of the radio unit 111, a first antenna set to #0 may use a reference signal $R_0$ such as antenna port=0 in FIG. 3. Among the two antennas, a second antenna set to #1 may use a reference signal $R_1$ such as antenna port=1 in FIG. 3. Since the respective antennas of the radio units 111 to 117 included in the same cell use the same reference signals, every first antenna among the antennas of the respective radio units 111 to 117 uses the reference signal $R_0$ and every second antenna uses the reference signal $R_1$.

Figure 4:
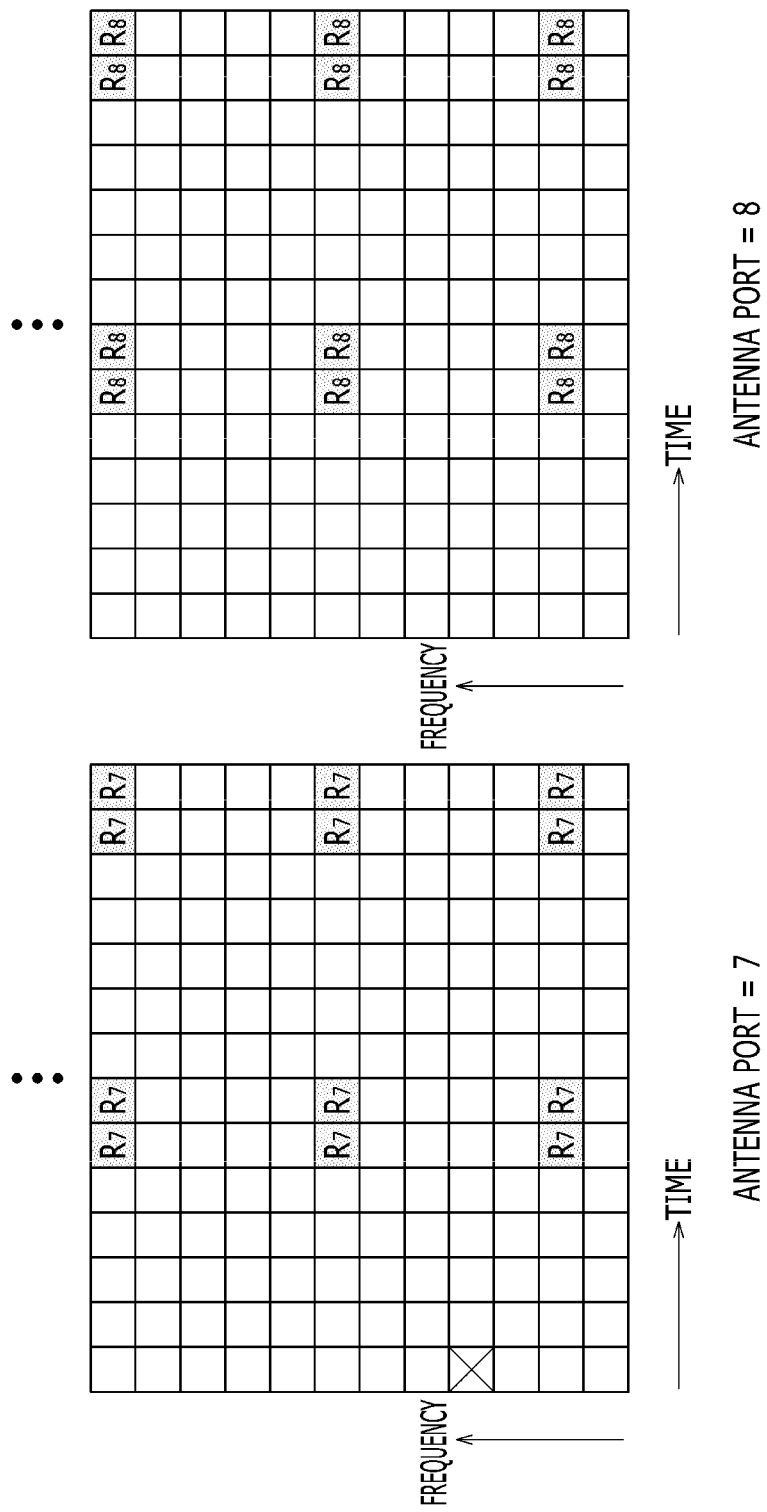
FIG. 4 is a view illustrating an example of a user-specific reference signal transmitted by the radio unit according to an embodiment of the present invention.

Meanwhile, for optimal data transmission with respect to each user, a special reference signal RS as illustrated in FIG. 4 may be transmitted in a section in which user data is transmitted. In this case, antenna port #7 and #8 are used. Namely, data may be transmitted according to unique channel characteristics of a user by allocating a user-specific RS.

Figure 3:
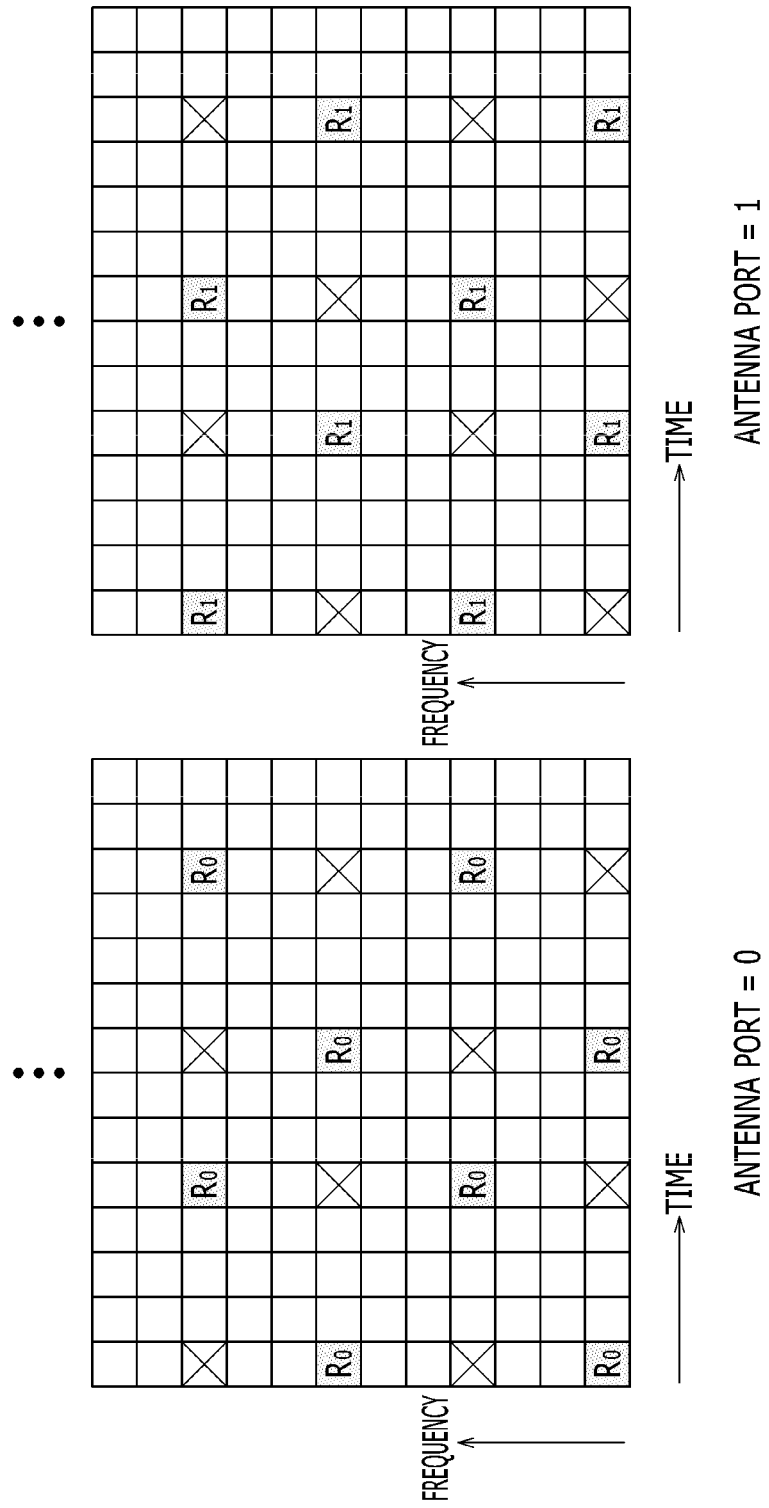
FIG. 3 is a view illustrating an example of a cell-specific reference signal transmitted by a radio unit according to an embodiment of the present invention.

In this case, as illustrated in FIGS. 3 and 4, the reference signals $R_0$, $R_1$, $R_7$, and $R_8$ may use resources based on an orthogonal frequency division multiplexing (OFDM) scheme.

The radio units 111 to 117 included in the single cell 10 may selectively transmit a data signal by using the same or different channel, respectively, and the cooperative radio units 112 and 117 transmit a data signal by using the same channel as that used by the macro radio unit 111.

Hereinafter, an example will be described in which a plurality of radio units 111 to 117 included in a cell transmit signals to terminals located in a boundary area of the regions of the radio units 111 to 117 in a general network.

Figure 5:
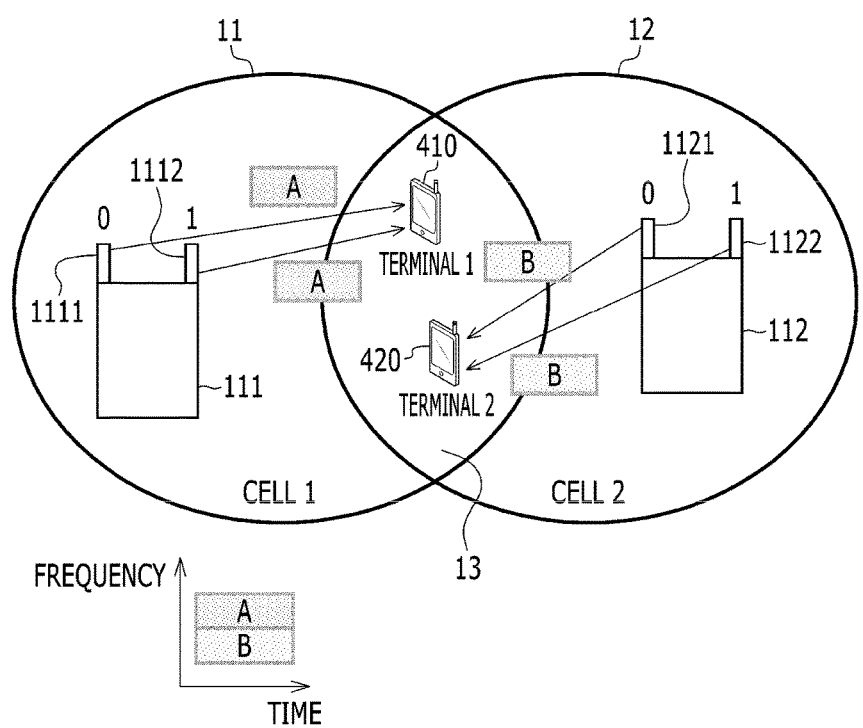
FIG. 5 is a view illustrating an example of signals transmitted by a plurality of radio units included in a cell in a typical network.

FIG. 5 is a view illustrating an example of signals transmitted by a plurality of radio units included in a cell in a typical network.

Referring to FIG. 5, radio units 111 and 112 are adjacent to each other in the cell 10, and thus a region 11 of the radio unit 111 and a region 12 of the radio unit 112 overlap to generate a boundary area 13. In order to support terminals 410 and 420 located in the boundary region 13, the single radio unit 111 supports the single terminal 410 and the single radio unit 112 supports the single terminal 420. In this case, the radio units 111 and 112 and the terminals 410 and 420 have two antennas, respectively, to support 2×2 MIMO transmission. Thus, a first antenna 1111 and a second antenna 1112 of the radio unit 111 transmit the same signals as signals having different transmission patterns, that is, as signals having different reference signals, to the terminal 410, and a first antenna 1121 and a second antenna 1122 of the radio unit 112 transmit the same signals as signals having different transmission patterns to the terminal 420. Here, in order to prevent interference of signals transmitted to the terminals 410 and 420 located in the boundary area 13, the radio units 111 and 112 transmits signals by using different channel resources. As illustrated in FIG. 5, the radio unit 111 transmits a signal by using channel A and the radio unit 112 transmits a signal by using a channel B.

According to the foregoing typical network, cells may be effectively designed but it is difficult to maximize system capacity.

Hereinafter, an embodiment of the present invention to maximize radio capacity will be described.

In an embodiment of the present invention, different cell IDs are used for cells, and thus, it is based upon the premise that each cell uses a cell-specific reference signal (RS).

First, in a first embodiment of the present invention, a case in which a terminal is adjacent to a cell in a cell boundary area will be described.

Figure 6:
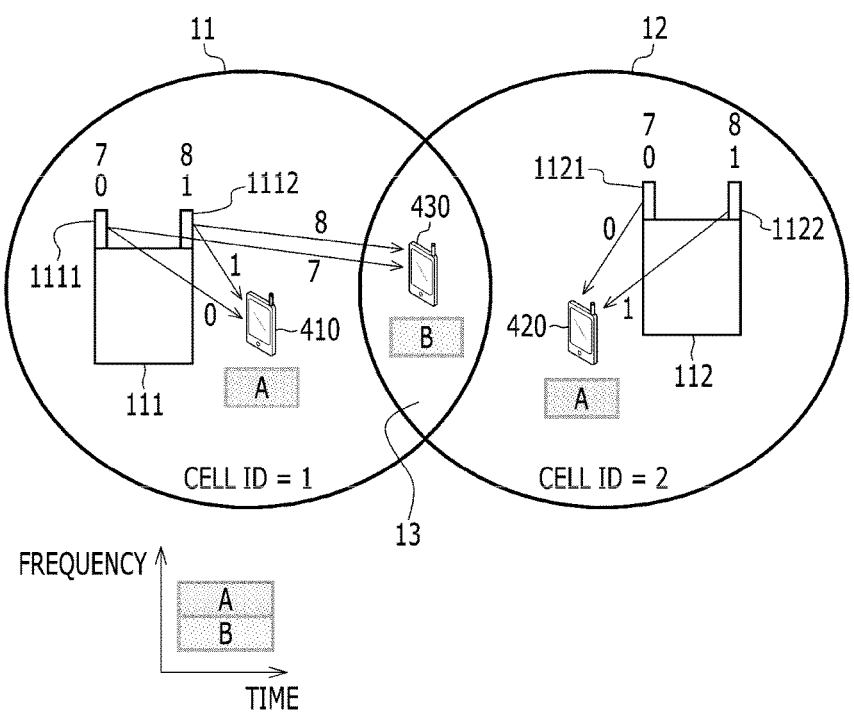
FIG. 6 is a view illustrating an example of signals transmitted by a plurality of radio units included in a cell according to a first embodiment of the present invention.

FIG. 6 is a view illustrating an example of signals transmitted by a plurality of radio units included in a cell according to a first embodiment of the present invention.

The radio units 111 and 112 according to an embodiment of the present invention each have two antennas to support 2×2 MIMO transmission, and the two antennas transmit the same data as signals having different transmission patterns, respectively. For example, a first antenna may transmit a signal having a first transmission pattern through port #0, and a second antenna may transmit a signal having a second transmission pattern through port #1. Also, the first antenna may transmit a signal having a third transmission pattern through port #7, and the second antenna may transmit a signal having a fourth transmission pattern through port #8.

Referring to FIG. 6, the radio units 111 and 112 included in the cell 11 whose cell ID is 1 and the cell 12 whose cell ID is 2, respectively, transmit data by using a cell-specific RS to the terminals 410 and 420 which are generally located within the cells 11 and 12 and not present in the cell boundary area 13. That is, the radio units 111 and 112 transmit data signals by using antenna ports #1 and #2, respectively. However, the radio units 111 and 112 transmit data to a terminal 430 which is located within the cell boundary area 13 and is adjacent to the cell 11 by using a user-specific RS. Namely, the radio units 111 and 112 transmit data signals by using antenna ports #7 and #8, respectively.

For example, the radio unit 111 that transmits a data signal to the terminal 410 uses the cell-specific antenna ports 0 and 1 and transmits the same data by using the channel A. The radio unit 112 that transmits a data signal to the terminal 420 also uses the cell-specific antenna ports 0 and 1 and transmits the same data by using the channel A. In this case, resource A is used, and here, resource usage efficiency may be enhanced by using a spatial reuse scheme in which different data are transmitted by using the same resource. However, in the case of the terminal 430 adjacent to the cell 11 in the boundary area 13, a channel measurement may not be properly performed due to interface by an RS transmitted by the cell 2 12, so a user-specific RS is used. Namely, the radio unit 111 transmits a data signal to the terminal 430 by using the antenna ports #7 and #8. In this case, data is transmitted to the terminal 430 by using a resource, i.e., resource B, different from that of the terminals 410 and 420 within the cells 11 and 12. In this manner, the terminal 430 may not be interfered with by the terminals 410 and 420 within the cell since the terminal 430 uses a different resource from the resource used by the terminals 410 and 420 at the inner side of the cell.

In this manner, channel prediction performance may be increased to improve data transmission performance by transmitting a data signal through a user-specific RS, rather than a cell-specific RS, to the terminal 430 adjacent to the cell 11 in the cell boundary area 13.

Meanwhile, the data signals transmitted by the radio units 111 and 112 as described above may use a resource based on an orthogonal frequency division multiplexing (OFDM) scheme or based on a wideband code division multiple access (WCDMA) scheme.

Hereinafter, a second embodiment of the present invention will be described in which a terminal is not adjacent to any cells in a cell boundary area (that is, a case in which a terminal is located in a cell overlap region).

Figure 7:
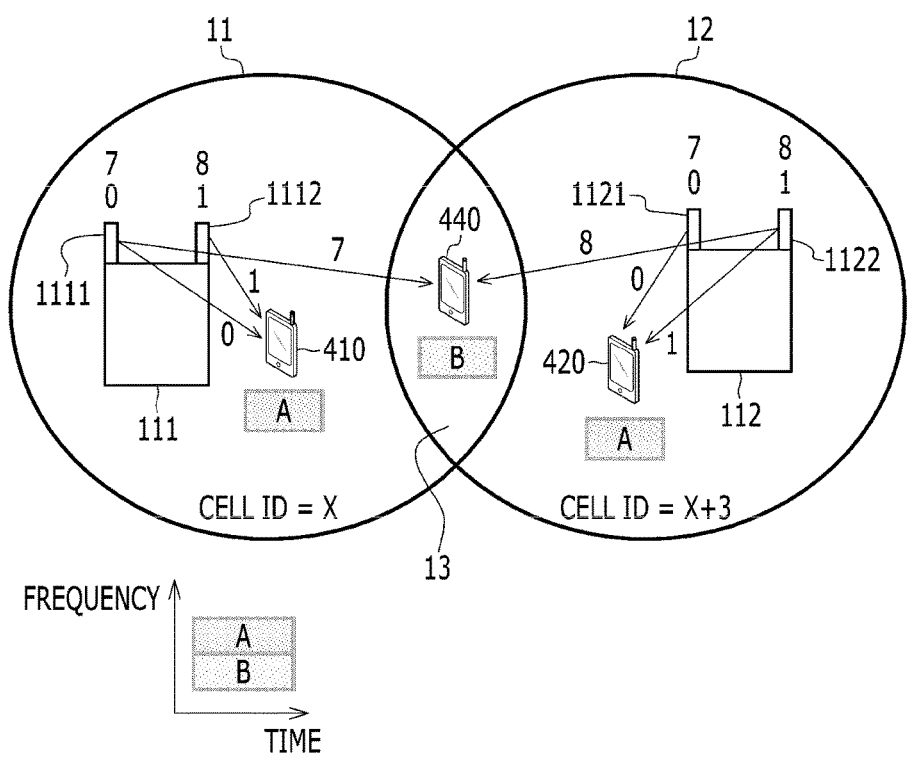
FIG. 7 is a view illustrating an example of signals transmitted by a plurality of radio units included in a cell according to a second embodiment of the present invention.

FIG. 7 is a view illustrating an example of signals transmitted by a plurality of radio units included in a cell according to a second embodiment of the present invention.

Referring to FIG. 7, the radio units 111 and 112 included in the cell 11 whose cell ID is x (e.g., x is a natural number) and the cell 12 whose cell ID is x+3, respectively, transmit data by using a cell-specific RS to the terminals 410 and 420 which are basically located within the cells 11 and 12 and not present in the cell boundary area 13. Namely, the radio units 111 and 112 transmit data signals by using antenna ports #0 and #1. However, to the terminal 440 located in the cell overlap region within the cell boundary region 13, the radio units 111 and 112 transmit the same data through a single antenna port, respectively, by using a user-specific RS. That is, the radio units 111 and 112 transmit the same data but as data having different patterns to the terminal 440.

For example, the radio unit 111 that transmits a data signal to the terminal 410 uses the cell-specific antenna ports 0 and 1 and transmits the same data by using the channel A. The radio unit 112 that transmits a data signal to the terminal 420 also uses the cell-specific antenna ports 0 and 1 and transmits the same data by using the channel A. In this case, resource A is used, and here, resource usage efficiency may be enhanced by using a spatial reuse scheme in which different data are transmitted by using the same resource.

However, with respect to the terminal 440 located in the cell overlap area in the boundary region 13, the radio unit 111 of the cell 11 transmits data to the terminal 440 by using the antenna port #7. The radio unit 112 of the cell 12 transmits data to the terminal 440 by using the antenna port #8. In this case, data is transmitted to the terminal 440 by using a resource, i.e., resource B, different from that of the terminals 410 and 420 within the cells 11 and 12. In this manner, the terminal 430 may not be interfered with by the terminals 410 and 420 within the cell since the terminal 430 uses a different resource from the resource used by the terminals 410 and 420 at the inner side of the cell.

Of course, the radio unit 112 of the cell 12 may transmit data to the terminal 440 by using the antenna port #7, and the radio unit 111 of the cell 11 may transmit data to the terminal 440 by using the antenna port #8.

In this manner, the terminal 440 receives the same data from the both radio units 111 and 112 since the data signals are transmitted from both cells through a user-specific RS that may be set for each user, rather than a cell-specific RS, to the terminal 440 located in the cell overlap area in the cell boundary area 13. Thus performance of a user in the boundary area may be improved through a diversity effect. In this case, although the user-specific RS is transmitted from the cell 12, it may be transmitted by using the user-specific RS that may be transmitted from the cell 11, so the terminal 440 may receive data in the same manner as it receives data transmitted from a single cell.

Meanwhile, in the above, the reason the cell IDs of the cell 11 and the cell 12 have a difference of a multiple of three by setting the cell ID of the cell 12 to x+3 when the cell ID of the cell 11 is x is because the adjacent cell 11 and the cell 12 are implemented to use the same reference signal in the same resource element to transmit the same data to the terminal 440 located in the cell overlap area to maximize a diversity effect.

Hereinafter, a third embodiment corresponding to a scheme of improving performance of the second embodiment of the present invention will be described.

Figure 8:
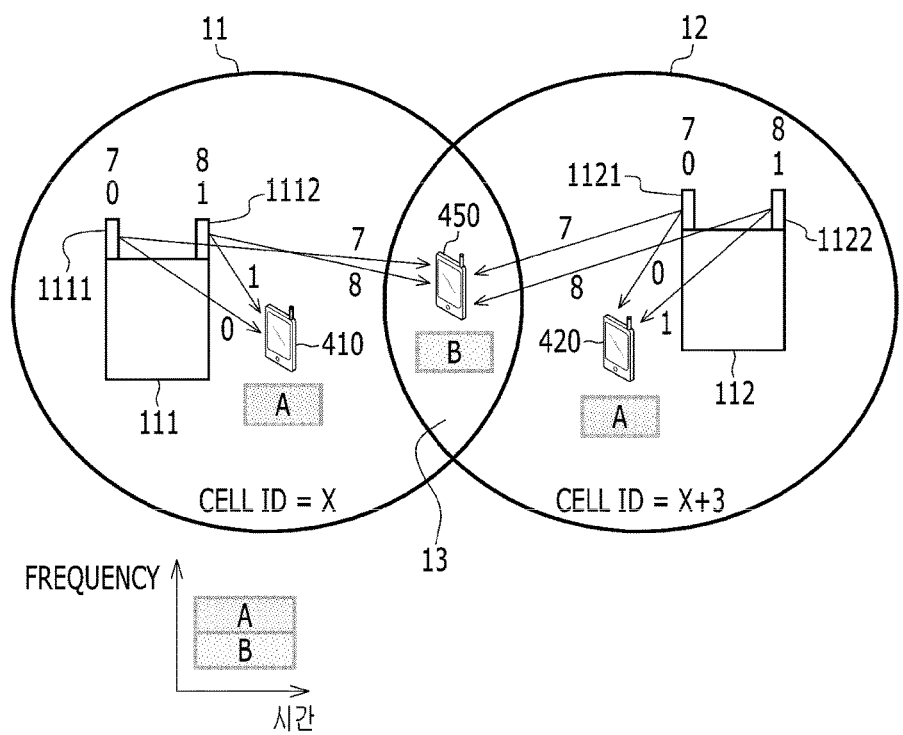
FIG. 8 is a view illustrating an example of signals transmitted by a plurality of radio units included in a cell according to a third embodiment of the present invention.

FIG. 8 is a view illustrating an example of signals transmitted by a plurality of radio units included in a cell according to a third embodiment of the present invention.

In the third embodiment of the present invention, the terminals 410 and 420 located within the cells 11 and 12 are the same as those of the second embodiment, so only components different from those of the second embodiment will be described.

Referring to FIG. 8, data is transmitted to a terminal 450 located in the cell overlap area within the cell boundary area 13 by using a user-specific RS. In this case, the radio units 111 and 112 transmit the same data through two antenna ports, respectively. That is, the radio units 111 and 112 transmit data signals to the terminal 450 by using both of their respective antenna ports #7 and #8.

As illustrated in FIG. 8, with respect to the terminal 450 located in the cell overlap area of the boundary area 13, the radio unit 111 of the cell 11 transmits a data signal to the terminal 450 by using the antenna ports #7 and #8, and the radio unit 112 of the cell 12 also transmits a data signal to the terminal 450 by using both antenna ports #7 and #8. In this case, the data signal transmitted through the antenna ports #7 and #8 of the radio unit 112 of the cell 12 and the data signal transmitted through the antenna ports #7 and #8 of the radio unit 111 of the cell 11 are identical.

In this case, data is transmitted to the terminal 450 by using a resource, i.e., resource B, different from that of the terminals 410 and 420 within the cells 11 and 12. In this manner, the terminal 430 may not be interfered with by the terminals 410 and 420 within the cell since the terminal 430 uses a different resource from the resource used by the terminals 410 and 420 at the inner side of the cell.

In this manner, the terminal 450 receives the same data from both radio units 111 and 112 since the same data signals are transmitted from both cells through the user-specific RS that may be set for each user, rather than a cell-specific RS, to the terminal 450 located in the cell overlap area in the cell boundary area 13. Thus performance of a user in the boundary area may be improved through a diversity effect.

Hereinafter, a method for applying the first embodiment, the second embodiment, and the third embodiment according to a location of a terminal will be described.

First, each of the two radio units 111 and 112 measures signal strength of an uplink received from a terminal and transmits the same to the digital unit 200. The digital unit 200 evaluates uplink quality of the terminal based on a signal strength value A received from the radio unit 111 and a signal strength value B received from the radio unit 112. That is, in a case in which an absolute value of a difference between the signal strength value A and the signal strength value B is equal to or greater than a first threshold value C1 as expressed by Equation 1 below, it may be determined that the terminal is included only within a cell and not located in the cell boundary area 13. Thus, in this case, the terminal is determined to correspond to the terminals 410 and 420 in the first, second, and third embodiments.

$$|A-B| \geq C1 \qquad \text{[Equation 1]}$$

However, in a case in which the absolute value of the difference between the signal strength value A and the signal strength value B is smaller than the first threshold value C1 and equal to or greater than a second threshold value C2, as expressed by Equation 2, it may be determined that the terminal is in the cell boundary area 13 and adjacent to a cell. In this case, the adjacent cell may be a cell having a larger value among the signal strength values A and B. Thus, in this case, the terminal is determined to correspond to the terminal 430 in the first embodiment.

$$C2 \leq |A-B| < C1 \qquad \text{[Equation 2]}$$

Also, in a case in which the absolute value of the difference between the signal strength value A and the signal strength value B is smaller than the second threshold value C2 and equal to or greater than a third threshold value C3 as expressed by Equation 3, it may be determined that the terminal is present in the cell boundary region 13 and located in the cell overlap area. Thus, in this case, the terminal is determined to correspond to the terminals 440 and 450 in the second and third embodiments.

$$C3 \leq |A-B| < C2 \qquad \text{[Equation 3]}$$

Here, the threshold values C1, C2, and C3 have magnitudes as expressed by Equation 4.

$$C3 < C2 < C1 \qquad \text{[Equation 4]}$$

Also, the threshold values C1, C2, and C3 may be variously determined according to capacity of a wireless communication system and as needed.

Hereinafter, the digital unit 200 will be described in detail with reference to FIG. 9.

Figure 9:
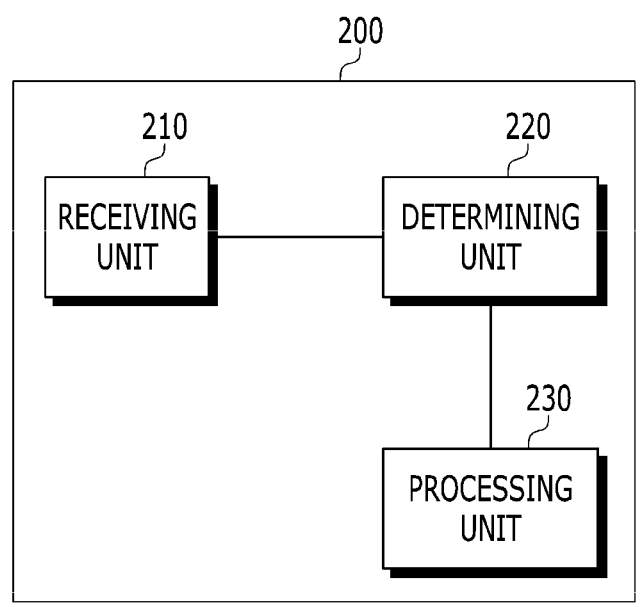
FIG. 9 is a block diagram of a digital signal processing device according to an embodiment of the present invention.

FIG. 9 is a block diagram of a digital signal processing device according to an embodiment of the present invention.

Referring to FIG. 9, the digital unit 200 includes a receiving unit 210, a determining unit 220, and a processing unit 230.

The receiving unit 210 receives radio signals from the radio units 111 and 112. The radio signals include signal strength values of uplink received by the radio units 111 and 112 from a terminal.

The determining unit 220 determines a location of the terminal by performing calculations expressed by Equation 1, Equation 2, and Equation 3 on the basis of the signal strength values received by the receiving unit 210.

The processing unit 230 performs processing to control data transmission of the radio units 111 and 112 according to determination of the determining unit 220. In particular, according to an embodiment of the present invention, when the terminal is located in the boundary area 13 of the radio units 111 and 112 and is adjacent to a cell, the radio unit 111 is controlled to transmit data through antenna ports #7 and #8 by using a user-specific RS, such as the operation applied to the terminal 430 of the first embodiment. Also, when the terminal is located in the boundary area 13 and located in a cell overlap area, the radio units 111 and 112 are controlled to transmit data through antenna port #7 or #8 by using the user-specific RS, like the operation applied to the terminal 440 of the second embodiment, or the radio units 111 and 112 are controlled to transmit data through the two antenna ports #7 and #8 by using the user-specific RS, like the operation applied to the terminal 450 of the third embodiment.

The invention claimed is:

1. A signal processing method for processing a signal by a signal processing system that includes a digital unit connected to a core system and a plurality of radio units physically separated from the digital unit and under a control of the digital unit, where the plurality of radio units includes a first radio unit and a second radio unit adjacent to the first radio unit, the signal processing method comprising:
  converting and amplifying, by each of the plurality of radio units, the digital signal received from the digital unit and transmitting the amplified signal to a terminal based on a multi-input multi-output (MIMO) transmission using two antennas; and
  receiving, by each of the plurality of radio units, a signal transmitted from the terminal based on the MIMO transmission using the two antennas and delivering the received signal to the digital unit,
  wherein the transmitting comprises:
    i) when the first terminal is located within a cell controlled by one of the first and second radio units, transmitting by each one of the first and second radio units data signals to a first terminal by using a cell-specific reference signal, and
    ii) when the first terminal is located in a cell boundary area of the first and second radio units, determining one closer to the first terminal between the first and second radio units, transmitting by the closer radio unit, the data signals to the first terminal using a user-specific reference signal,
  wherein the signal processing method further comprises:
    transmitting, by the first and second radio units, signal strength values of an uplink received from the first terminal to the digital unit, and
    determining, by the digital unit, which one of the first and second radio units is closer to the first terminal located in the cell boundary area on the basis of the signal strength values transmitted from the first and second radio units,
  wherein the determining comprises:
    when an absolute value of a difference between the signal strength values transmitted from the first and second radio units falls between a first threshold value and a second threshold value, determining, by the digital unit, that the first terminal in the cell boundary area is closer to the first radio unit than the second radio unit and controls the first radio unit to transmit the data signals by using the user-specific reference signal.

2. The signal processing method of claim 1, further comprising: controlling, by the digital unit, the first and second radio units to transmit the data signal by using the cell-specific reference signal when the absolute value of the difference between the signal strength values transmitted from the first and second radio units is greater than or equal to the first threshold value.

3. The signal processing method of claim 1, wherein resources allocated for transmitting the data signals using the cell-specific reference signal are different from resources allocated for transmitting the data signal using the user-specific reference signal.

* * * * *